Patented Feb. 19, 1952

2,586,329

UNITED STATES PATENT OFFICE 2,586,329

AMINOPHYLLINE FATTY ALCOHOL SUPPOSITORY

Edward K. Harvill, Essex, Conn., assignor to Ernst Bischoff Company, Inc., Ivoryton, Conn., a corporation of Connecticut No Drawing. Application October 26, 1948, Serial No. 56,680

3 Claims. (Cl. 167—64)

This invention relates to a suppository base consisting essentially of higher fatty alcohols, and to suppositories made by incorporating a medicament in such a base.

The suppository base above referred to may be used for a wide variety of types of products and may be used as a base or vehicle for numerous drugs or medicaments. For the purposes of illustrating a preferred embodiment of the invention, however, the suppository base will be described with particular reference to its use with aminophylline as the drug.

The suppository base which has long been employed in the prior art consists of cacao butter. This material is readily available and has the unique property of being solid and sufficiently hard to permit handling at room temperature, and yet has a melting point slightly below body temperature. Thus, a suppository made with a cacao butter base melts soon after application in a bodily cavity and the drug is thus released for absorption by the body.

Such a prior art suppository, for example, may be made by mixing 2.0 grams of cacao butter with 0.5 gram of aminophylline. When freshly prepared, such a suppository melts completely in ten minutes at body temperature and has a definite therapeutic action in that relief from bronchial asthma can be obtained within 30 minutes after application.

While such suppositories are satisfactory when freshly prepared, it has been determined that after standing for some time, these suppositories are relatively ineffective in alleviating bronchial asthma. Investigations showed that after prolonged standing, particularly upon storage in warm climates, these suppositories do not melt readily at body temperature. Suppositories of the above formulation which have stood for a long time after manufacture have been found to have melting points so far above body temperature as to be rated ineffective therapeutically. Such a high melting point, it will be understood, makes it impossible for the suppository to liquefy when used in the body and therefore greatly inhibits the absorption of the active drug by the body.

This condition has been recognized to some extent, and at least one attempt has been made to overcome it by preparing a suppository containing aminophylline in which the base material is a polyethyleneglycol such as that available under the trade-name of "Carbowax." While such a suppository has greater stability or shelf life, it has met with little success because it depends upon the moisture content present in the bodily cavity for the dissolving of the base material (which is soluble in water) and in this way making the active drug available for absorption by the body. Experience has shown that supposi- tories made with a polyethyleneglycol base are only very slowly affected by the moisture in a bodily cavity and therefore the therapeutic action is of a greatly delayed type. In conditions of bronchial asthma, for example, quick action is essential so that the asthmatic attack can be promptly alleviated. Therefore, up to the present time most aminophylline suppositories are still made with a cacao butter base and only in a few instances have the "Carbowax" bases been employed. The art is in need of an aminophylline suppository that is quick acting and has a long stable shelf life.

As illustrative of the deterioration of a suppository made with cacao and aminophylline as the active drug, a suppository of standard formulation was prepared and samples stored at room temperature (20° C.) for different periods of time. The freshly prepared sample, and the samples stored for different periods of time were subjected to melting point determination to ascertain the length of time required for the suppository to start melting when placed in an oven at 37.5° C. (body temperature), and the length of time for suppository to melt completely at this temperature. The results are given in the following table:

Table I

| Days at Room Temperature | Melting at 37.5° C. Started | Melting at 37.5° C. Completed |
|---|---|---|
|  | Minutes | Minutes |
| 0 | 8 | 10 |
| 63 | 13 | 38 |
| 70 | 13 | 38 |
| 77 | 14 | 39 |
| 93 | 20 | 42 |
| 126 | 20 | 42 |

These data show that after a shelf life of only about four months, the initial melting time is more than double and the final melting time more than quadrupled. The prolonged melting time, even if no other factor were involved, indicates the delayed release of the drug when the suppository is used.

To determine if any factor other than mere increase in melting point were involved, a test was developed to measure the aminophylline content of a freshly prepared suppository and the same suppository after standing.

In accordance with this test, one suppository was added to 75 cc. of distilled water and the solution boiled gently for three minutes during which time the suppository completely melted, or in the case of a badly deteriorated suppository, it softened to a marked extent so that at any event the aminophylline entered the aqueous solution. The mixture was then chilled until the cacao butter congealed and the aqueous solution titrated with a standard 1/10 normal hydrochloric acid solution. It was found that the amount of acid required to neutralize a fresh suppository was greater than that required to neutralize a suppository which had aged, indicating that in the aged sample, there was less aminophylline which required neutralization. The difference between the amount of acid required to neutralize a fresh suppository and an aged sample was divided by the amount for the fresh sample and multiplied 100. This value was expressed as the percentage of deterioration. The following samples which were freshly prepared and stored for different lengths of time at room temperature (20° C.) were analyzed by this method and the results are shown in the following table:

Table II

| Days at Room Temperature | cc. N/10 HCl | Percent Deterioration |
|---|---|---|
| 63 | 22.28 | 5.6 |
| 70 | 21.77 | 7.7 |
| 77 | 21.50 | 8.9 |
| 84 | 21.27 | 9.8 |
| 91 | 21.25 | 9.9 |
| 98 | 20.86 | 11.5 |
| 105 | 20.41 | 16.3 |
| 112 | 19.36 | 16.5 |
| 119 | 18.70 | 23.6 |
| 126 | 18.30 | 22.5 |

It will be seen by a study of the data in Tables I and II that not only is the melting point of a four months' old suppository increased so that its therapeutic action is greatly delayed, due to slow melting, but the amount of the active aminophylline drug in the suppository has decreased by 20% as measured by the titration test.

In order that the deterioration for storage periods longer than four months may be determined, or at least generally predicted, an accelerated aging test was developed in accordance with which the suppository samples were stored at 65° C. for different lengths of time. The freshly prepared suppositories, as shown heretofore in Table I, melted at 37.5° C. in eight to ten minutes. After storage at 65° C. for twenty-four hours, the suppositories were solid at this temperature and of course did not melt at 37.5° C. during any length of time. This accelerated test showed that the aging at 65° C. for twenty-four hours was equivalent to far more than the four-months' shelf life.

The samples which had been aged in the accelerated aging test at 65° C. for different periods of time were tested by the titration test previously described and the results are shown in the following table:

Table III

| Time, hours | cc. N/10 HCl | Percent deterioration |
|---|---|---|
| 0 | 23.75 | |
| 1 | 23.3 | 1.87 |
| 4 | 21.2 | 10.7 |
| 6 | 17.1 | 27.9 |
| 24 | 4.42 | 81.5 |
| 48 | 3.61 | 84.0 |
| 72 | 1.22 | 94.0 |

A comparison of Table II and Table III shows that four hours' storage at 65° C. is about equivalent to 95 days' storage at room temperature, insofar as percent of decomposition is concerned. Because of the correlation between these two tables over the common portion, it is possible to extrapolate and determine deterioration for periods of shelf life much longer than those for which it is feasible to make actual tests. The accelerated test can be made very quickly in the laboratory, and in view of the correlation obtained, can be relied upon to give reasonably good predictions of what will happen to suppositories on the shelf for long periods.

In order to determine whether the aminophylline per se was deteriorating, or whether there is some connection between the aminophylline and the cacao butter base, the accelerated deterioration test on the aminophylline powder per se was made and the results are shown in the following table:

Table IV

| Hours at 65° C. | cc. N/10 HCl | Percent deterioration |
|---|---|---|
| 0 | 18.05 | 0 |
| 24 | 16.62 | 7.8 |
| 48 | 16.15 | 10.5 |
| 72 | 14.60 | 19.1 |

A comparison of Tables III and IV shows that while there was some deterioration of the aminophylline per se upon storage at 65° in accordance with the accelerated aging test, the deterioration was much more marked in the case of the aminophylline in the cacao butter suppository base.

I have discovered, in accordance with my invention, that a satisfactory suppository base may be formed from a mixture of fatty alcohols. These alcohols are selected and proportioned so that the mixture is solid at room temperature but melts or softens sufficiently at body temperature to release the drug quickly after use of the suppository. In addition to having the desirable property of quick melting and prompt release of the drug for absorption by the body, suppositories made with a fatty alcohol base have a long shelf life and show no deterioration, as will be seen from the data included hereinafter. Suppositories made with the fatty alcohol base in accordance with the invention, meet all of the desirable requirements from a clinical, manufacturing, and marketing point of view.

The term "higher fatty alcohol" as used herein refers to the aliphatic alcohols having 8 to 24 carbon atoms in a hydrocarbon chain, either straight or branched, saturated or unsaturated, having an alcoholic (OH) group attached to the chain at the primary or any secondary position. Most of the commercially available alcohols have 12 to 18 carbon atoms. Examples of the commercially available saturated alcohols are lauryl alcohol, myristyl alcohol, palmityl alcohol, cetyl alcohol, and stearyl alcohol. Oleyl alcohol is the most common of the unsaturated alcohols but similar unsaturated alcohols containing 12 to 18 carbon atoms are known and may be used.

The alcohols are selected with reference to their melting points and proportioned so that the mixture is solid at room temperature, but has a melting or marked softening point at or just below body temperature. Normally solid cetyl alcohol (M. P. about 49.5°) may be mixed with normally liquid oleyl alcohol (M. P. about 3° C.) in about equal proportions to be solid at 20 to 25° C. but liquid at 37° C. Myristyl alcohol on the other hand (M. P. about 39° C.) melts only slightly above body temperature and will require only a small amount of oleyl alcohol to form a mixture that has the required melting and solidification properties. Stearyl alcohol melts higher than cetyl and would require more oleyl for admixture therewith than with cetyl to have the same melting properties. Lauryl alcohol, while saturated, nevertheless is normally a liquid (M. P. about 10 to 12° C.) and can be mixed with the suppositories previously tested, and samples were tested for melting when fresh and for deterioration after aging at 65° C. The results are shown in the following table:

Table V

| Composition of Base (Alcohol and Amount) | 45% Cetyl (U. S. P.)-55% Oleyl (U. S. P.) | 50% Cetyl (U. S. P.)-50% Oleyl (U. S. P.) | 55% Cetyl (U. S. P.)-45% Oleyl (U. S. P.) | 60% Cetyl (U. S. P.)-40% Oleyl (U. S. P.) | 40% Cetyl (U. S. P.)-60% Oleyl Technical |
|---|---|---|---|---|---|
| Melting at 37.5° C.: | | | | | |
| Melting started, minutes | 4 | 5 | 8 | 10 | (¹) |
| Melting completed, minutes | 12 | 12 | 17 | 20 | (¹) |
| Per Cent Deterioration at 65° C.: | | | | | |
| 0 hours | 0 | 0 | 0 | 0 | 0 |
| 24 hours | 5.8 | 9.4 | 9.1 | 8.2 | 4.7 |
| 48 hours | 8.1 | 13.4 | 13.8 | 11.4 | 10.4 |
| 72 hours | 16.3 | 18.9 | 16.8 | 14.2 | (¹) |

¹=Not run.

normally solid alcohols melting above body temperature to compound a mixture having the required hardening and melting points.

An amount of the normally liquid higher fatty alcohol may be selected within the range of about 70 to 40% and mixed with an amount of the normally solid higher fatty alcohol within the range of about 30-60% to give the above-described properties as will be seen from the examples described hereinafter.

Because of their ready commercial availability, mixtures of cetyl and oleyl alcohol are preferred within the range of 45 to 65 parts of cetyl alcohol with 55 to 45 parts of oleyl alcohol depending on the melting properties desired. The effect of proportions within this range will be seen subsequently in Table V. The following additional compositions are satisfactory:

|  | Per cent |
|---|---|
| 1. Cetyl alcohol | 50 |
| Lauryl alcohol | 50 |
| 2. Stearyl alcohol | 33 to 40 |
| Lauryl alcohol | 67 to 60 |
| 3. Stearyl alcohol | 30 |
| Oleyl alcohol (technical) | 70 |

It will be appreciated that while these alcohols can be obtained in a relatively pure (U. S. P.) form, they are more readily obtained on the market as a mixture of alcohols. Thus technical oleyl alcohol also contains stearyl alcohol, hexadeconal and cetyl alcohol and has a cloud point of 19° C., as compared with a melting point of 2° C. for the pure compound as given in the literature. This composition must be kept in mind in compounding the suppository base. Thus a preferred embodiment would comprise 60% cetyl alcohol and 40% oleyl (U. S. P.) alcohol, and 50% cetyl alcohol and 50% technical oleyl alcohol.

It is believed that the one skilled in the art in view of the above examples will readily understand the compounding of normally solid and normally liquid alcohols to form a mixture that is solid and handleable at room temperature but melts within reasonable time at body temperature. All such mixtures of all of the above-described alcohols are contemplated.

As illustrative of the quick melting properties and improvement in stability of an aminophylline suppository made with a fatty alcohol base in accordance with my invention, as compared with the conventional cacao butter base, suppositories were made up with four different bases as illustrative, each having the same amount of aminophylline as was in the cacao butter base A comparison of Tables IV and V shows that the deterioration after storage at 65° C. for 72 hours was of the same order or generally less than the deterioration of the aminophylline powder itself when subjected to the same accelerated storage test. Thus it is concluded that the aminophylline is as stable as or more stable in the fatty alcohol base than it is itself.

A comparison of Table V with Table III shows the markedly enchanced inhibition in deterioration after 24, 48 and 72 hours' storage, when the suppository is compounded with the fatty alcohol base in accordance with the invention, as compared with the suppositories made with the conventional cacao butter base.

The suppositories made in accordance with the invention with the fatty alcohol base which had been aged for 24, 48 and 72 hours at 65° C. showed no change whatever in their melting characteristics, and after the aging periods, had substantially the same melting characteristics as given in Table V for the freshly prepared suppository. After storage at 65° C. (at which temperature the suppositories made in accordance with the invention were liquid at the conclusion of the test) they could be molded again into the shaped suppositories which had the original melting characteristics.

While my invention is not to be limited to any theory which explains the unusal and advantageous results obtained, the following was developed by me as a possible explanation.

Aminophylline is formed by reacting ethylenediamine with theophylline. Ethylenediamine is a relatviely strong base and its association or combination with theophylline is a relatively loose one. Thus the ethylene-diamine in the aminophylline is more or less available for dissociation and reaction. In my opinion, it reacts with the fatty acid esters in cacao butter base to form a diamide of ethylenediamine and long chain fatty acids. The melting points of these amides are very high, generally above 100° C., and the reaction probably proceeds during storage to form relatively large amounts of the amides. The extent of the reaction increases with an increase in storage temperature. If my explanation is correct, it will now be understood why the melting point of the cacao butter base suppositories containing aminophylline increases upon standing or accelerated aging, namely the amides formed by the reaction of the ethylene diamine with the esters in the cacao butter have a high melting point and their presence increases the melting point of the suppository mixture.

Similarly, the ethylenediamine, being combined with the ester to form the amide is not available for titration with acid, and the extent to which the aminophylline as decomposed to liberate the ethylenediamine for chemical combination with the esters in the cacao butter is revealed by the titration analysis.

I have described my invention particularly in connection with the use of the fatty alcohol suppository bases in combination with aminophylline, because the results are particularly outstanding. The suppository base composed of a mixture of fatty alcohols is not so limited in use, and may be used with other drugs. The alcohols are relatively inert and therefore serve as an ideal base for any drug all of which are more or less reactive, although few are as reactive as aminophylline.

Furthermore the fatty alcohols are superior to cacao butter because the latter is an ester of a fatty acid of the general class used in food products which are assimilated and used by the body. The high fatty alcohols, however, are very poorly metabolized and are relatively inert within the body. Thus they may be used as a vehicle without introducing complications due to the absorption and assimilation of the base. This is desirable because the action on the body can be confined to the drug. Futhermore, the relative inertness of the alcohol renders them resistant to other forms of deterioration.

In addition, the alcohols can be compounded so as to have the relatively sharp melting point necessary for a suppository base, a characteristic of them not appreciated heretofore, but one so essential as to confine prior art bases largely to cacao butter.

While in the preferred embodiment of my invention, I employ fatty alcohols as the sole medium of the base, it will be obvious that a certain small amount of adulterants may be used without departing from the invention and the advantages obtained thereby, i. e., small amounts of paraffin wax and other inert materials may be tolerated. Especially is this so since the alcohols commercially available for practising the invention will contain small amounts of adulterants or impurities. By the expression "consisting essentially of" higher fatty alcohols as used herein, I refer to a composition in which the primary and essential compounds are fatty alcohols but not excluding a small amount of the inert materials as a diluent which do not interfere with the properties of the composition suiting it for a suppository base.

The suppository base must be substantially free from esters of higher fatty acids, such as oils and fats, i. e., it must not contain an amount which would appreciably raise the melting point due to amide formation. Amounts of a few per cent may be tolerated and commercial fatty alcohols may contain such small amounts since they are generally made synthetically by the reduction of fats. Large amounts of esters must be excluded as is shown by the fact that aminopyhlline in a mixture of equal parts of cetyl alcohol and cacao butter is even less stable than pure cacao butter itself. This applies to esters other than oils or fats such as the glycol esters; i. e., glycolmonostearate and polyethyleneglycolstearate since these have the ester linkage.

In view of the foregoing explanation of my invention and its preferred embodiment, it will be obvious that it includes variations and modifications all of which are intended to be included as fall within the scope of the following claims.

I claim:

1. A suppository comprising aminophylline incorporated in a vehicle consisting essentially of an amount of a normally liquid higher fatty alcohol within the range of about 70% to 40% in admixture with an amount of a normally solid higher fatty alcohol within the range of about 30 to 60% to be solid at ambient temperature and melting at 37.5° C., and substantially free from esters of higher fatty acids.

2. A suppository comprising aminophylline incorporated in a vehicle consisting essentially of a mixture of cetyl alcohol and oleyl alcohol in proportions to be solid at ambient temperature and melting at body temperature, and substantially free from esters of higher fatty acids.

3. A shaped suppository comprising aminophylline in a therapeutic dosage incorporated in a vehicle consisting essentially of about equal parts of cetyl alcohol and technical oleyl alcohol, and substantially free from esters of higher fatty acids.

EDWARD K. HARVILL.

REFERENCES CITED

The following references are of record in the file of this patent:

UNITED STATES PATENTS

| Number | Name | Date |
| --- | --- | --- |
| 2,300,769 | Berry | Nov. 3, 1942 |

OTHER REFERENCES

Halpern: J. A. P. A. Scientific Edition, April 1947, pages 101 to 104.

Buchi: Schweizerische Apotheker-Zeitung, July 12, 1941, page 389, 167–64.

Martindale: The Extra Pharmacopoeia, volume 1, 22nd edition, 1941. The Pharmaceutical Press, London. Pages 788, 986 to 987. (Copy in Division 43.)